H. E. WELTY.
HYGIENIC THERMOS FOOD CONTAINER.
APPLICATION FILED MAY 7, 1920.
1,371,336.
Patented Mar. 15, 1921.
2 SHEETS—SHEET 1.
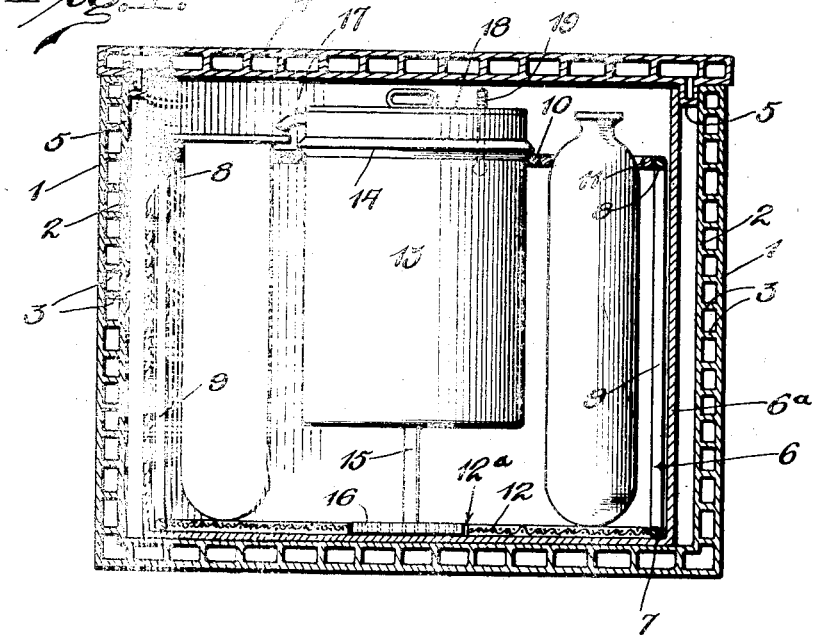
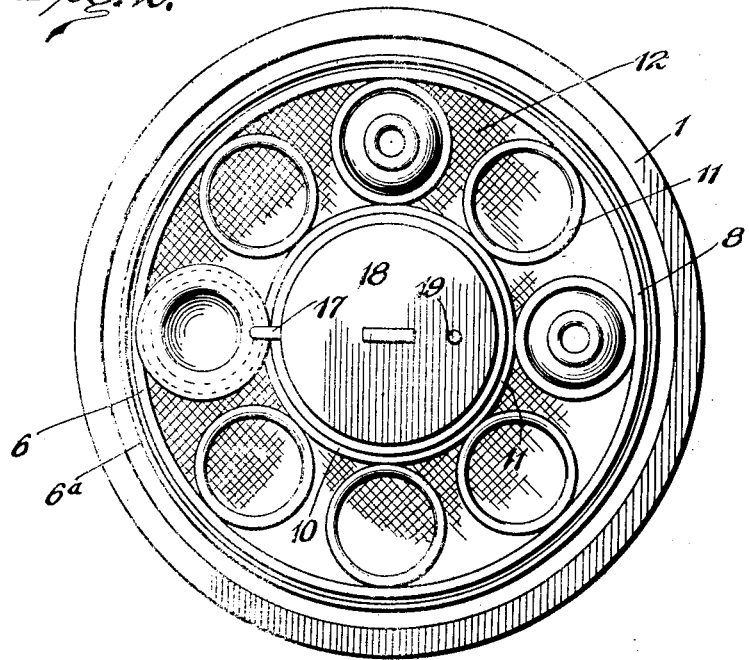
Inventor
Helen E. Welty
by Fred P. Gorin
Attorney H. E. WELTY.
HYGIENIC THERMOS FOOD CONTAINER.
APPLICATION FILED MAY 7, 1920.
1,371,336.
Patented Mar. 15, 1921.
2 SHEETS—SHEET 2.
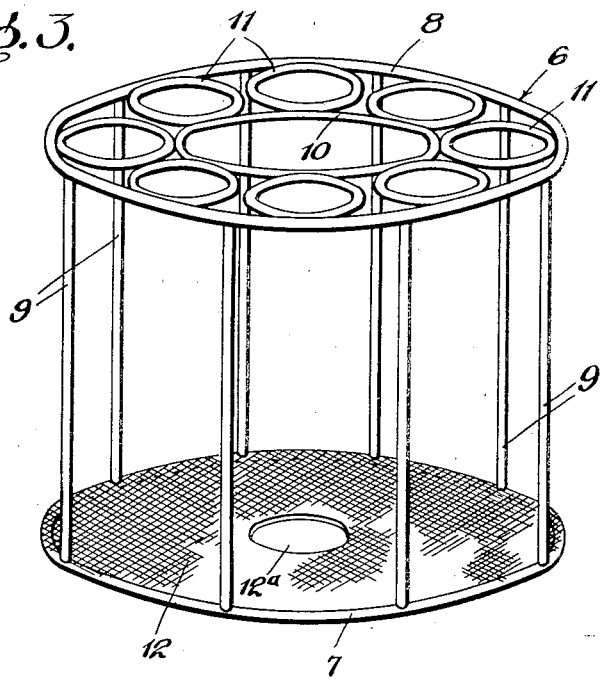
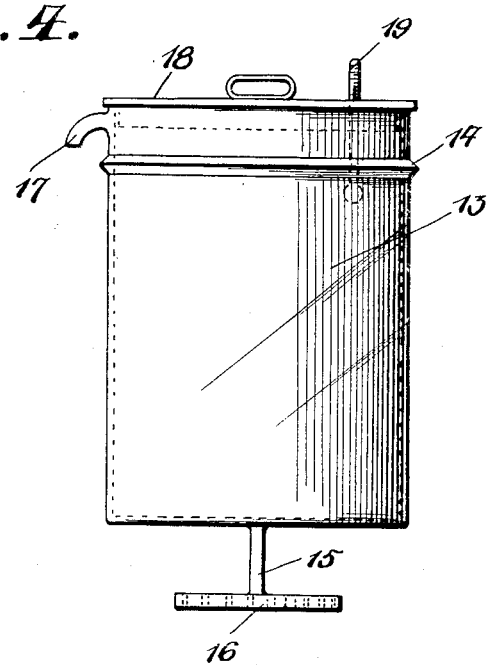
Inventor
Helen E. Welty
by J. P. Gorin
Attorney

UNITED STATES PATENT OFFICE.

HELEN E. WELTY, OF SEATTLE, WASHINGTON.

HYGIENIC THERMOS FOOD-CONTAINER.

1,371,336.  Specification of Letters Patent.  Patented Mar. 15, 1921.

Application filed May 7, 1920. Serial No. 379,547.

*To all whom it may concern:*

Be it known that I, HELEN E. WELTY, a citizen of the United States, and residing at Seattle, in the county of King and State of Washington, have invented certain new and useful Improvements in Hygienic Thermos Food-Containers, of which the following is a specification.

This invention relates to food cookers and containers.

One of the prime objects of the invention is to provide a structure in which food may be conveniently cooked, and at the same time form a suitable support for bottles to sterilize the latter while the cooking is going on.

A further object of the invention is to provide means which may be utilized as a cooker and sterilizer or as a refrigerator.

The invention also comprehends improvements in the details of construction and arrangement of parts which will be hereinafter described and particularly pointed out in the claim.

In the drawings:—

Figure 1 is a central section of my improved combined cooker and sterilizer.

Fig. 2 is a plan view with the cover removed.

Fig. 3 is a detail perspective view of the inner utensil supporting frame.

Fig. 4 is a detail view of the utensil for holding the food while being cooked.

The invention is primarily intended for handling baby food, but is in no way specifically limited to this use.

The numeral 1 indicates an outer casing, having a double spaced wall 2, suitably reinforced at 3, and the air drawn from the space to form a partial vacuum, a cover 4 is provided, same being formed with inner and outer spaced walls with the air drawn from the space to form a partial vacuum. The cover 4 is also provided with an annular depending flange 5, which fits snugly against the inner wall 2 of the casing.

Within the outer casing is a container $6^a$ which is supported on the bottom of said casing, and its upper edge fits snugly against the inner surface of the depending flange 5.

Fitting within the container $6^a$ is a supporting frame 6, comprised of a lower ring member 7; an upper ring member 8; vertical rods 9, connecting the two ring members; an inner smaller ring member 10 disposed within the upper ring member 8; and intermediate ring members 11, disposed between the upper ring member 8, and the smaller ring member 10. The rings 8, 10, and 11 are soldered or otherwise permanently fastened together to form a substantial frame structure.

The lower ring member 7, supports a piece of wire mesh 12, which forms a false bottom, is apertured as at $12^a$, and extends over the entire space within said ring. 13 indicates a cooker formed with an annular flange 14, which rests on the ring 10. Depending from the bottom of the cooker is a stem 15, provided at its lower end with a flat plate or base 16, which normally extends through the aperture $12^a$ and rests upon the bottom of the container $6^a$ for conveying heat directly from the bottom of the container $6^a$ to the cooker 13, as shown in Fig. 1. The cooker is provided with a pouring spout 17, and a cover 18, and through the latter extends a thermometer 19.

When in use the supporting frame 6 is placed in the container, and the cooker with the food is placed within the ring 10, and is supported thereon by the flange 14, and bottles to be sterilized are placed in the intermediate rings 11, the bottoms resting on the wire mesh. The container is now supplied with water and moved to a stove, the food being thereby cooked, and the steam and hot water simultaneously acting to sterilize the bottles.

After the food is cooked, the liquid food is poured through the spout 17 and into the bottles, the water is removed and in lieu of food, ice is introduced into the cooker. The container $6^a$ together with the frame supporting the cooker and bottles filled with the cooked food is introduced into the casing, and the cover 4 is put in place. The depending flange 5, snugly fits in the space between the casing and the container and prevents the latter rattling or moving about.

By this means the partial vacuum in the casing maintains the low temperature and thereby preserves the food.

The base 16, affords a convenient support for the cooker and conveys heat to the cooker, while the wire mesh readily catches anything dropped into the frame and keeps the container clean, and at the same time affords a convenient means for supporting the bottles.

The invention is simple and affords a compact and convenient utensil which may be used either as a cooker or a refrigerator.

What I claim is:—

The combination with a casing having non-heat conducting walls and bottom, a non-heat conducting cover, a metal container adapted to fit within the casing, said container being closed by the top of the casing with said top having a hollow depending flange between the container and casing, a supporting frame arranged within the container and having a foraminous bottom formed with a central opening, said container having a central support, a cooker adapted to seat in said support and having a lower projecting portion to extend through an opening in the bottom of the frame and directly engage the container, said frame having a series of supports arranged about the cooker support.

In testimony whereof I affix my signature.

HELEN E. WELTY.